Oct. 13, 1970  H. A. KANNEGIETER  3,533,654
SHIFTABLE BUMPER

Filed Jan. 30, 1968  4 Sheets-Sheet 1

INVENTOR.
HAROLD A. KANNEGIETER
BY
Burd, MacEachron, Braddock,
Bartz & Schwartz
ATTORNEYS Oct. 13, 1970     H. A. KANNEGIETER     3,533,654
SHIFTABLE BUMPER
Filed Jan. 30, 1968     4 Sheets-Sheet 3
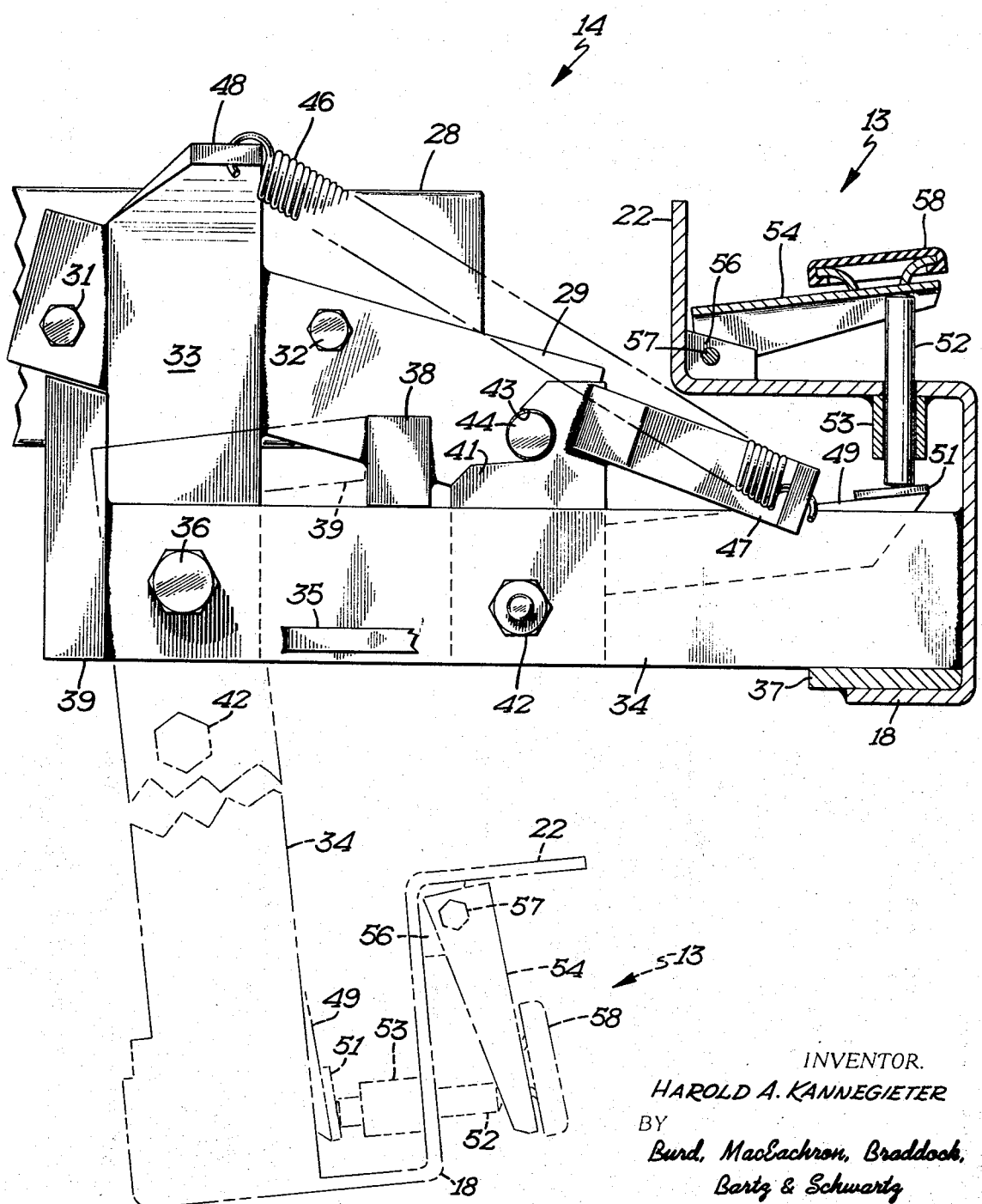
INVENTOR.
HAROLD A. KANNEGIETER
BY
Burd, MacEachron, Braddock,
Bartz & Schwartz
ATTORNEYS

United States Patent Office 3,533,654
Patented Oct. 13, 1970

3,533,654
SHIFTABLE BUMPER
Harold A. Kannegieter, Box 226,
Willow Lake, S. Dak. 57278
Filed Jan. 30, 1968, Ser. No. 701,763
Int. Cl. B60r *19/04;* B61f *19/04;* B62d *43/04*
U.S. Cl. 293—73                                          11 Claims

ABSTRACT OF THE DISCLOSURE

A pickup truck equipped with a pivotally mounted rear bumper attached to the frame of the truck with separate latch assemblies operable to hold the bumper in a substantially horizontal up position and allow the bumper to swing downwardly to a generally down vertical position so that the tail gate of the truck can swing all of the way down. Each latch assembly has a rearwardly directed pivoted arm secured to the bumper pivotally carrying a latch which cooperates with a pin to hold the arm and bumper in the up position. A spring biases the arm upwardly and in engagement with a stop and holds the latch in a lock position on the pin. A release lever pivotally mounted on the top of the bumper moves the latch from the pin so that the arm and bumper can swing to the down position. Mounted on the frame immediately forward of the bumper is a spare tire carrier which is readily accessible when the bumper is in the down position to permit the removal of the tire from the truck.

BACKGROUND OF INVENTION

The invention generally relates to a bumper pivotally mounted to the frame of a vehicle by latch assemblies which are operable to hold the bumper in a substantially horizontal up position and allow the bumper to swing to a generally vertical down position. It is common practice to mount the spare tire of a vehicle, as a pickup truck, under the rear portion of the body of the truck immediately forward of the rear bumper. With the conventional tire carrier it is difficult to remove the spare tire with a fixed conventional bumper. Pivoted bumpers have been designed for tank trucks to protect the rear of the truck. These bumpers swing to up positions to permit the free use of the tank faucets at the rear of the trucks. Examples of this structure are shown in U.S. Pats. No. 1,513,991 and No. 1,515,111.

SUMMARY OF INVENTION

The invention is directed to a bumper latch assembly for pivotally mounting a bumper on the rear frame of a vehicle. A pair of latch assemblies have separate release means and are mounted on the bumper to connect the opposite portions of the bumper to the frame of the vehicle. The latch assemblies cooperate with each other to hold the bumper in a substantially horizontal up position and when both are released allow the bumper member to swing to a generally vertical down position exposing the spare tire carrier mounted on the rear frame. Each latch assembly has a support securable to the frame and an arm pivotally mounted on the support and secured to the bumper. The arm engages a stop means to locate the bumper in the horizontal up position. Projected from the support is a pin which cooperates with a latch movably mounted on the arm to lock the arm and hold the bumper member substantially in the up position. A spring connected to the latch and the support holds both the latch in engagement with the pin and the arm in engagement with the stop. Each latch is controlled by a separate lever mounted on the top of the bumper. When the lever is depressed the latch is released thereby allowing the bumper to pivot to the vertical position. Both latches must be released before the bumper is free to move to the vertical down position.

The spare tire carrier is mounted on the frame adjacent the latch assemblies so that when the bumper is down the spare tire can be easily removed from the carrier. The tire carrier has a movable carriage carrying the tire slidably mounted on support rails mounted on the frame. The carriage is movable in a rearward direction to expose the tire so that it is easily removed from the carriage.

In the drawings:

FIG. 4 is a side view of the latch assembly holding the bumper in a horizontal transverse up position;

Figure 1:
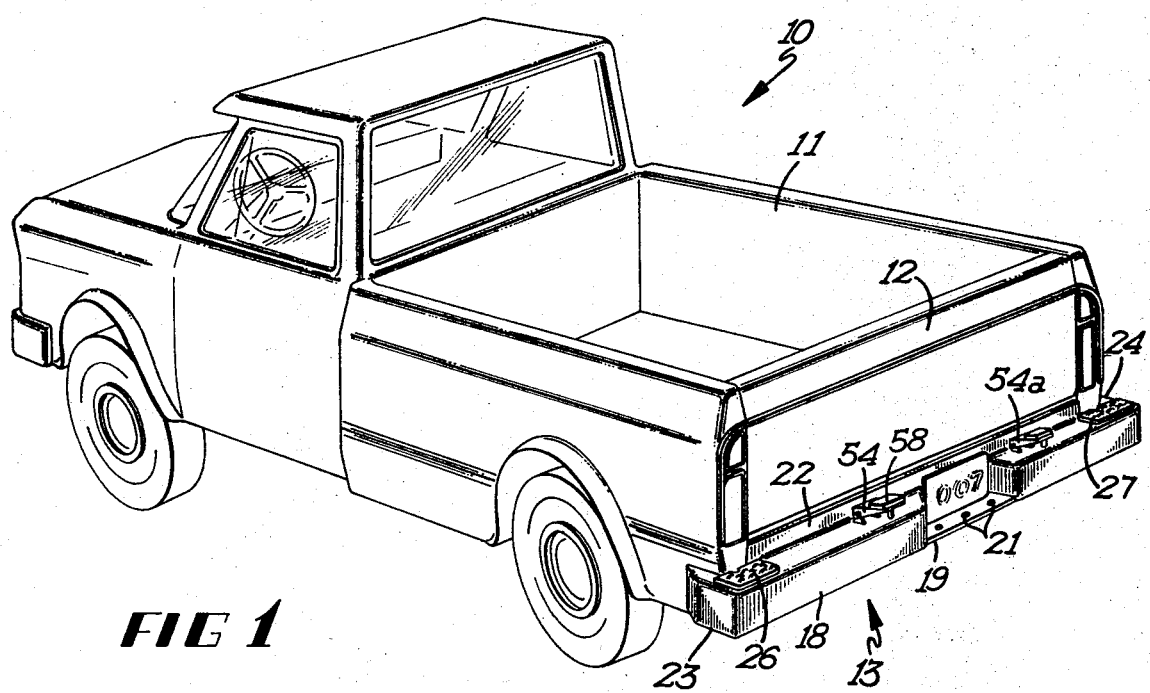
FIG. 1 is a perspective view of a pickup truck equipped with the drop bumper of the invention.
Figure 2:
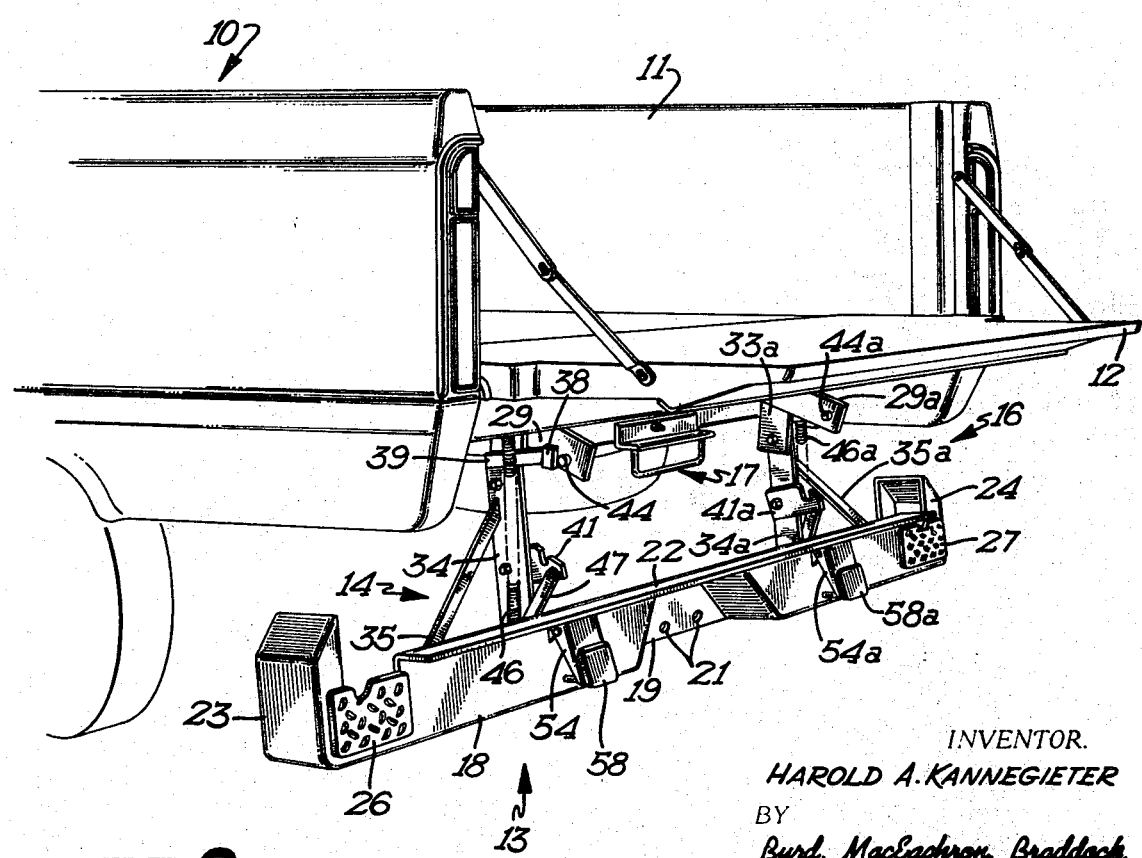
FIG. 2 is an enlarged perspective rear view of the pickup truck showing the bumper in the lowered position and the spare tire carrier.
Figure 3:
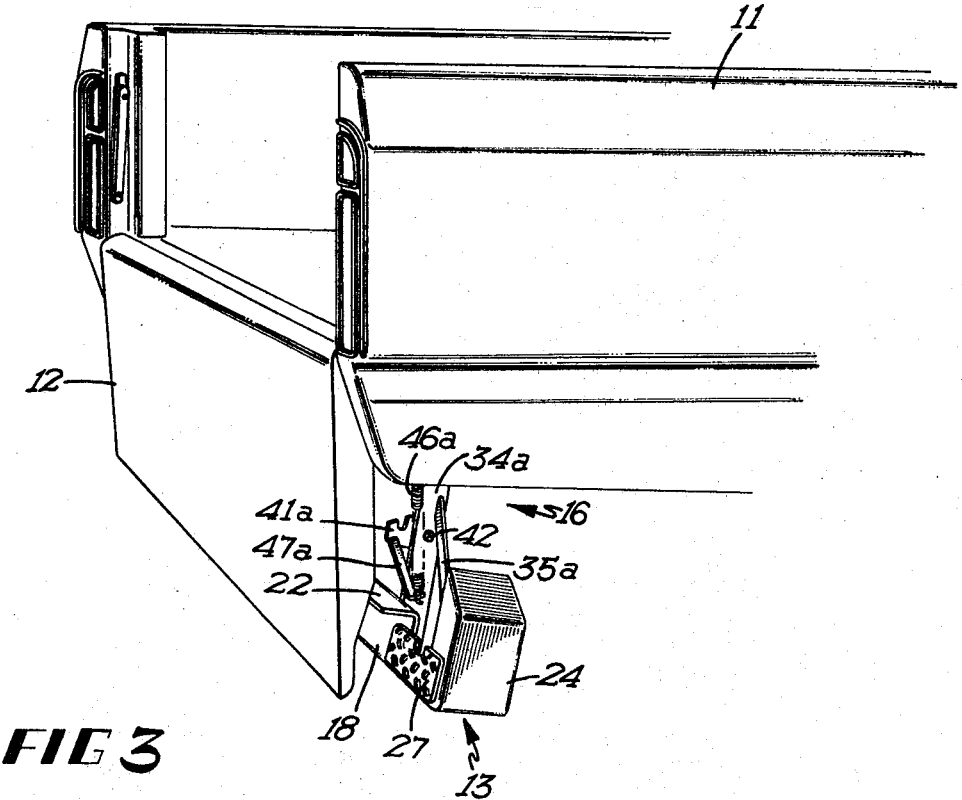
FIG. 3 is an enlarged perspective rear view of the pickup truck showing the bumper in the lowered position and the truck tail gate in a vertical down position.

Referring to the drawings there is shown in FIG. 1 a pickup truck 10 having an open top body 11 and a tail or rear end gate 12. Gate 12 pivotally connected to the sides of the body swings from an upright closed position outwardly to a horizontal position, shown in FIG. 2, and a down open position, shown in FIG. 3. Extended transversely across the rear of the body 11 below gate 12 is a rear bumper indicated generally at 13. As shown in FIG. 2, latch assemblies 14 and 16 movably mount the bumper on the rear portions of the longitudinal frame of the truck. The latch assemblies 14 and 16 cooperate with each other to hold the bumper 13 in the raised up position adjacent the bottom of gate 12. Both latch assemblies must be released before the bumper can be lowered to the down position shown in FIGS. 2 and 3.

Located between the latch assemblies 14 and 16 and mounted on the beams is a spare tire carrier indicated generally at 17. When the bumper is in the down position the spare tire is accessible and readily removed from the tire carrier 17.

Bumper 13 has a transverse body 18 extending the entire width of the truck body 11. The center section of body 18 has a forwardly directed recess for the license plate. The bottom of the recess is closed with a horizontal hitch plate 19 having holes 21 used to receive pins for connecting tow vehicles and objects to the bumper.

The cross sectional shape of the bumper body 18 is shown in FIG. 4. Body 18 has a channel shape with an upright transverse flange 22 extended along the top of the bumper. The channel shaped portion and flange 22 of the body are formed from a single piece of metal. Secured to the opposite ends of body 18 are forwardly directed side members 23 and 24. The side members 23 and 24 each have a box shape and a forwardly and inwardly tapered front end. As shown in FIG. 1, the side members provide bumper protection for the rear side skirts of the truck body 11. The side members 23 and 24 may be formed from the same piece of metal as the body 18. Step plates 26 and 27 located at opposite ends of the body 18 secure the top of the body 18 to the side members 23 and 24.

Latch assemblies 14 and 16 are identical in structure and function. The following description is limited to latch assembly 14 with the corresponding parts of latch assembly 16 identified with the same reference number having the suffix A. As shown in FIG. 4, latch assembly 14 mounted on the rear or truck frame 28 has a downwardly and rearwardly extended support plate 29 secured to the side of frame 28 with a pair of nut and bolt assemblies 31 and 32. Welded to the outside of plate 29 is an upright member 33. A rearwardly extended arm 34 is pivotally mounted on the lower end of member 33 by a transverse pivot bolt 36. The rear section of arm 34 is secured to the bumper body 18 and a horizontal plate 37 attached to the lower flange of the body 18. A diagonal brace 35 secured to a rear portion of the arm 34 extends outwardly and rearwardly to the outer end of the bumper body 18.

The arm 34 is located in a generally horizontal position by a stop block 38 secured to the mid-section of support plate 29. Block 38 has a flat bottom surface engageable by the top edge of arm 34 to limit the upward pivotal movement of the arm. When the arm 34 is in the horizontal position the bumper 13 is in the up position in horizontal alignment with the rear of truck frame 28. An upright finger member 39 is secured to the forward end of arm 34. As shown in broken lines in FIG. 4, when the bumper is in the down position the upper end of finger member 39 engages the forward side of block 38 to limit down movement of the bumper.

Extended upwardly from the mid-section of arm 34 is a pivotal latch 41. A transverse nut and bolt assembly 42 pivotally mounts the latch 41 on the arm 34. The upper end of latch 41 has a forwardly open notch or recess 43 forming a hook which cooperates with a pin 44 secured to and projected laterally from the side of the rear end of support plate 29. The latch 41 locks on the pin 44 to hold arm 34 in the horizontal position. Latch 41 is biased to the lock position by a spring 46. The rear end of spring 46 is connected to an offset member 47 secured to and projected rearwardly from the upper end of latch 41. The opposite or forward end of spring 46 is connected to an outwardly turned upper end 48 of the upright member 33. The offset member 47 and end 48 of the spring 46 locate it adjacent the outside of arm 34 and latch 41 so that the spring does not interfere with the down swing of the arm. As shown in FIG. 2, with bumper 13 down, spring 46 is expanded providing a force urging the bumper up. This force reduces the effort required to pivot the bumper back to the up position.

Figure 5:
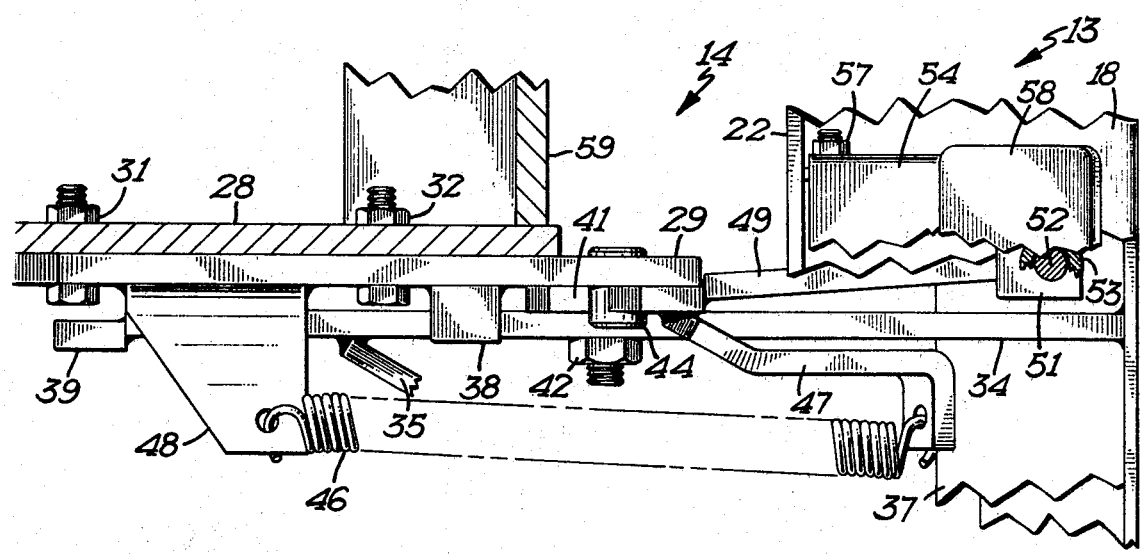
FIG. 5 is a plan view of the latch assembly of FIG. 4.

As shown in FIGS. 4 and 5, an arm 49 secured to the rear side of latch 41 projects rearwardly into the bumper body 18. The arm 49 serves as a lever movable to release the latch from the pin 44. A flat support 51 is secured to the top of the outer end of arm 49 in alignment with an upright rod 52 projected through a hole in the bumper body 18. Rod 52 is slidably supported in an upright sleeve 53 attached to the underside of the top flange of the bumper body 18.

The upper end of rod 52 engages a lever 54 pivotally mounted on the bumper body 18. Lever 54 has side flanges located adjacent upright ears 56 secured to the top of bumper body 18. Pivot bolts 57 connect the lever flanges to the ears. The upper outer end of lever 54 carries a pad 58 of resilient material, as rubber, plastic or the like.

To release the latch 41 from the pin 44 the lever 54 is forced down moving rod 52 down through sleeve 53. This moves arm 49 down pivoting latch 41 rearwardly away from pin 44 against the biasing force of spring 46. As soon as the latch clears pin 44 the bumper 18 is free to pivot down. Arm 34 pivots down about bolt 36 until member 39 hits stop block 38. Before the bumper 18 can be pivoted to the down position both latches 41 and 41A must be concurrently released from their respective holding pins. This is a safety feature preventing accidental dropping of the bumper in the event that one latch is released.

Figure 6:
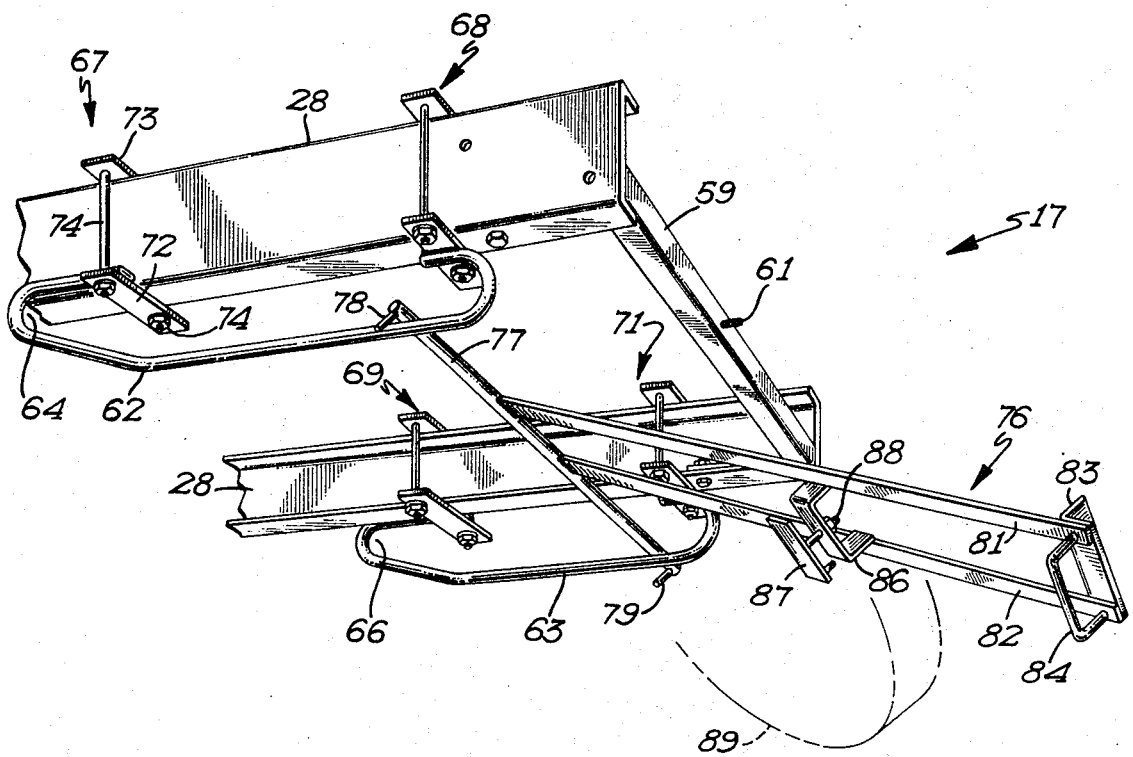
FIG. 6 is a perspective view of the spare tire carrier.
Figure 7:
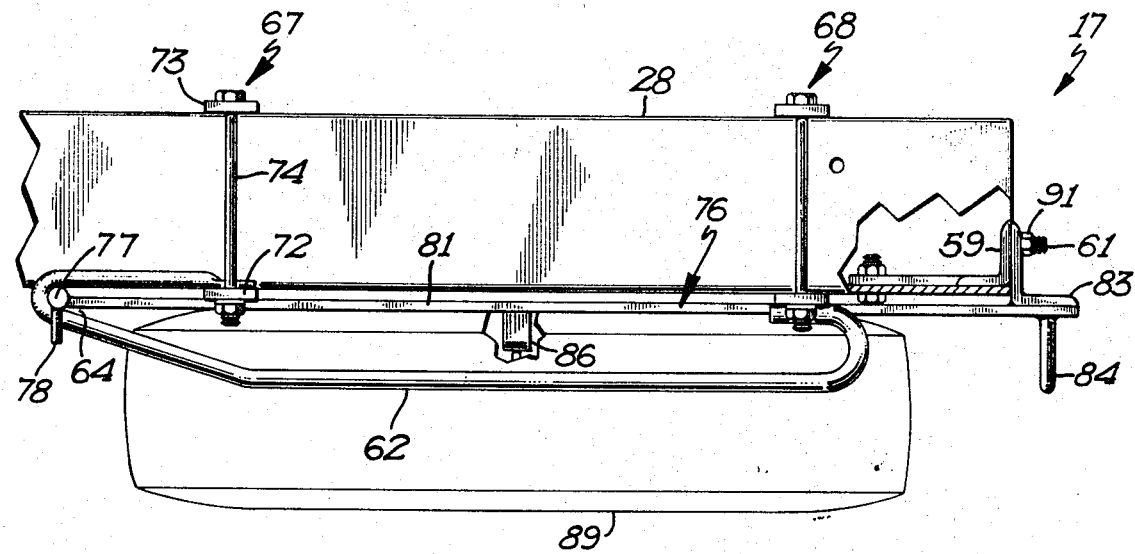
FIG. 7 is a side view of the spare tire carrier in the tire storing position.

Referring to FIGS. 6 and 7, the spare tire carrier 17 has a cross beam 59 mounted on the rear of the truck frames 28. A threaded stud 61 projects rearwardly from the mid-section of the cross beam. Located below the frames are rails 62 and 63. The rails have upwardly and inwardly curved ends located below the bottom of the frame spacing the longitudinal sections of the rails from the frame. The forward ends of the rails 62 and 63 slope upwardly forming pockets 64 and 66 respectively.

Clamp assemblies or universal mounting brackets indicated generally at 67, 68, 69 and 71 attach the rails to the frames 28. The brackets are secured to the facing ends of rails and are identical in structure. Brackets 67, described in detail, has a bottom plate 72 and a top plate 73 positioned adjacent the top and bottom of the frame. Bolts 74 connect the plates 72 and 73 on opposite sides of the frame to clamp the plates on the frame. The forward end of rail 62 is secured to plate 72. This bracket is adapted to be attached to different sized frames.

Slidably supported on the rails 62 and 63 is a carriage 76 carrying a spare tire 89. Carriage 76 comprises a cross bar or front support rod 77 having downwardly directed projections 78 and 79 secured to its opposite ends. The bar 77 rides on the upper portions of the rails 62 and 63. The projections 78 and 79 limit lateral movement of the bar on the rails. A pair of spaced longitudinal members 81 and 82 are secured at their forward ends to the mid-section of bar 77. Transverse angle member 83 is attached to the rear ends of the members 81 and 82. A U-shaped handle 84 is attached to the members 81 and 82 below angle member 83. Angle member 83 has a hole for the stud 61 whereby nut 91 threaded on stud 61 holds the carriage 76 in the travel or transport position as shown in FIG. 7. A U-shaped transverse member 86 is secured to the mid-sections of the members 81 and 82. Member 86 cooperates with a wheel support bracket 87 and a bolt and nut assembly 88 to clamp the rim of the tire to the carriage. The member 86 is spaced from the tire rim. When the nut of assembly 88 is tightened the tire contacts the longitudinal members 81 and 82 at four separate points thereby stabilizing the tire on the carriage.

As shown in FIG. 7, when carriage 76 is in the transport position the cross bar 77 is wedged upwardly into the pockets 64 and 66 at the forward ends of the rails tight against the underside of the frame. Nut 91 holds the carriage in the transport position. The tire is removed from the carriage by dropping the bumper 13 and removing nut 91. The carriage is then pulled out rearwardly as shown in FIG. 6. The tire is removed from the carriage by releasing the nut of assembly 88.

While there has been shown and described a preferred embodiment of the invention it is understood that changes may be made without departing from the invention. The bumper and latch assemblies and spare tire carrier are adaptable to vehicles other than pickup trucks. The invention is defined in the following claims.

The embodiments of the invention in which an exclusive property or privilege is claimed are defined as follows:

1. A bumper mountable on the frame of a vehicle comprising: a bumper member extended transversely of the frame, a pair of latch assemblies pivotally mounting the bumper member on the frame, said latch assemblies operable to hold the bumper member in a substantially horizontal position and allow the bumper member to swing to a generally vertical position, each of said latch assemblies having a support securable to the frame of the vehicle, arm means secured to the bumper member, means pivotally mounting the arm means on the support, stop means engageable with the arm means to locate the bumper in the horizontal position, a pin projected from the support, latch means connected to the arm means and engageable with said pin to lock the arm means to hold the bumper member substantially horizontal, spring means connected to the latch means and support to hold the latch means in engagement with the pin and the arms means in engagement with the stop means, and means secured to the latch means movable to release the latch means from the pin whereby the arm means and bumper pivot to the vertical position.

2. The bumper of claim 1 wherein the support includes an upright member, said arm means pivotally mounted on the lower end of the upright member, and said spring means connected to the upper end of said upright member.

3. The bumper of claim 1 including a member secured to the arm means, said member engageable with the stop means when the bumper member is in the vertical position.

4. The bumper of claim 1 wherein said stop means is a block secured to the support.

5. The bumper of claim 1 wherein said support is a plate securable to the side of the vehicle frame.

6. The bumper of claim 1 wherein the means secured to the latch means is an arm having an end located adjacent the inside of the bumper member, said bumper member including levers pivotally mounted on the top of the bumper member and rigid means extend through the top of the bumper connecting the levers and the end of the arms secured to the latch means whereby movement of both levers releases both latch means allowing the bumper member to move to the vertical position.

7. A bumper latch assembly comprising: a support securable to a frame of a vehicle, an arm, means pivotally mounting the arm on the support, stop means secured to the support and engageable with the arm to limit movement of the arm in one direction relative to the support, a pin projected laterally from the support, latch means movably mounted on the arm and engageable with the pin to lock the arm in a first position and biaising means connected to the support and latch means to hold the latch means in engagement with the pin and hold the arm in engagement with the stop means and means secured to the latch means movable to release the latch means from the pin whereby the arm is movable to a second position.

8. The bumper latch of claim 7 including means for pivotally mounting the latch means on a mid-portion of the arm, said latch means comprising a plate having a hook recessed engageable with the pin.

9. The bumper latch of claim 7 including a member secured to the arm, said member engageable with the stop means when the arm is in the second position.

10. The bumper latch of claim 7 wherein the support includes an upright member, said arm pivotally mounted on the lower end of the upright member, and said biasing means connected to the upper end of the upright member and the upper end of the latch means.

11. The bumper latch of claim 7 wherein the means secured to the latch means is a member extended generally parallel to the arm pivotally mounted on the support.

References Cited

UNITED STATES PATENTS

| | | | |
|---|---|---|---|
| 1,513,991 | 11/1924 | Homan et al. | 293—69 |
| 1,515,111 | 11/1924 | Heil et al. | 293—69 |
| 1,596,903 | 8/1926 | Thwaits | 293—73 |
| 1,951,888 | 3/1934 | Tinsley | 108—160 |
| 2,313,582 | 3/1943 | Rees | 126—191 |
| 2,954,255 | 9/1960 | Bates | 293—73 X |
| 3,369,683 | 2/1968 | Richards | 224—42.23 XR |
| 3,435,971 | 4/1969 | Powell | 224—42.23 XR |

ARTHUR L. LA POINT, Primary Examiner

H. BELTRAN, Assistant Examiner

U.S. Cl. X.R.

16—146; 108—132; 126—191; 211—99; 224—42.21, 42.23; 248—240, 292; 280—150; 285—87; 292—278; 293—69, 99; 298—38